United States Patent
Zhang et al.

(10) Patent No.: US 9,438,445 B2
(45) Date of Patent: *Sep. 6, 2016

(54) MEDIA ACCESS CONTROL PROTOCOL FOR MULTI-HOP NETWORK SYSTEMS AND METHOD THEREFOR

(75) Inventors: Hang Zhang, Nepean (CA); Peiying Zhu, Kanata (CA); Mo-Han Fong, L'Original (CA); Wen Tong, Ottawa (CA); Nimal Senarath, Nepean (CA); Derek Yu, Kanata (CA); David Steer, Nepean (CA); Curtis S. Dodd, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 285 days.

This patent is subject to a terminal disclaimer.

(21) Appl. No.: 13/620,567

(22) Filed: Sep. 14, 2012

(65) Prior Publication Data

US 2013/0016651 A1    Jan. 17, 2013

Related U.S. Application Data

(63) Continuation of application No. 12/299,790, filed as application No. PCT/CA2007/000839 on May 11, 2007, now Pat. No. 8,576,882.

(60) Provisional application No. 60/746,996, filed on May 11, 2006, provisional application No. 60/820,510, filed on Jul. 27, 2006, provisional application No. 60/868,444, filed on Dec. 4, 2006, provisional application No. 60/868,441, filed on Dec. 4, 2006, provisional application No. 60/892,549, filed on Mar. 2, 2007.

(51) Int. Cl.
| | |
|---|---|
| *H04L 12/46* | (2006.01) |
| *H04L 12/721* | (2013.01) |
| *H04W 40/00* | (2009.01) |
| *H04W 28/06* | (2009.01) |
| *H04W 84/12* | (2009.01) |
| *H04L 1/16* | (2006.01) |
| *H04L 29/06* | (2006.01) |
| *H04W 88/04* | (2009.01) |
| *H04L 29/08* | (2006.01) |

(52) U.S. Cl.
CPC ........... *H04L 12/4633* (2013.01); *H04L 45/34* (2013.01); *H04W 40/00* (2013.01); *H04L 1/1614* (2013.01); *H04L 63/12* (2013.01); *H04L 69/22* (2013.01); *H04L 69/324* (2013.01); *H04W 28/06* (2013.01); *H04W 84/12* (2013.01); *H04W 88/04* (2013.01)

(58) Field of Classification Search
None
See application file for complete search history.

(56) References Cited

U.S. PATENT DOCUMENTS 5,287,343 A * 2/1994 Nakamura et al. ........... 370/243
5,467,345 A   11/1995 Cutler et al.

(Continued)

OTHER PUBLICATIONS

Office Action issued in U.S. Appl. No. 12/299,790, filed Jun. 9, 2011; 17 pages.

(Continued)

*Primary Examiner* — Andrew Oh
(74) *Attorney, Agent, or Firm* — Fish & Richardson P.C.

(57) ABSTRACT

A method and system for wireless communication in which a plurality of media access control ("MAC") packet data units ("PDUs") corresponding to a plurality of wireless communication connections are received. The plurality of MAC PDUs is grouped into a relay packet and the relay packet is transmitted. Such grouping and transmission of the relay packet is performed by one or more relay nodes. The traffic control for the transmission can also be based on centralized or decentralized routing control and/or centralized or decentralized QoS control.

23 Claims, 9 Drawing Sheets

(56) References Cited

U.S. PATENT DOCUMENTS

| | | | | |
|---|---|---|---|---|
| 5,506,838 A * | 4/1996 | Flanagan | H04L 45/02 | 370/258 |
| 5,600,798 A * | 2/1997 | Cherukuri | H04L 12/4604 | 370/230 |
| 5,781,534 A * | 7/1998 | Perlman | H04L 45/26 | 370/248 |
| 6,138,019 A | 10/2000 | Trompower et al. | | |
| 6,683,866 B1 * | 1/2004 | Stanwood | H04L 29/06 | 370/338 |
| 6,952,421 B1 * | 10/2005 | Slater | H04L 45/00 | 370/401 |
| 7,031,281 B1 | 4/2006 | Zhang | | |
| 7,376,137 B2 | 5/2008 | Sung et al. | | |
| 7,471,669 B1 * | 12/2008 | Sabesan | H04L 45/02 | 370/351 |
| 7,839,891 B1 | 11/2010 | Allan | | |
| 7,990,995 B2 * | 8/2011 | Nishibayashi | H04L 45/00 | 370/394 |
| 8,159,955 B2 | 4/2012 | Larsson | | |
| 8,325,656 B2 | 12/2012 | Lindskog et al. | | |
| 8,576,882 B2 * | 11/2013 | Zhang et al. | | 370/501 |
| 2002/0141355 A1 | 10/2002 | Struhsaker et al. | | |
| 2003/0063348 A1 * | 4/2003 | Posey, Jr. | H04L 45/00 | 398/49 |
| 2004/0120349 A1 * | 6/2004 | Border | H04L 1/0066 | 370/474 |
| 2004/0163019 A1 * | 8/2004 | Elfering et al. | | 714/52 |
| 2004/0213198 A1 | 10/2004 | Mahmood et al. | | |
| 2004/0235468 A1 * | 11/2004 | Luebke et al. | | 455/426.1 |
| 2005/0010668 A1 * | 1/2005 | Chen | H04L 61/2514 | 709/227 |
| 2005/0041696 A1 * | 2/2005 | Pekonen | H04H 20/28 | 370/537 |
| 2005/0114391 A1 * | 5/2005 | Corcoran | G06F 9/4401 | |
| 2005/0114489 A1 * | 5/2005 | Yonge, III | H04L 1/0061 | 709/223 |
| 2005/0152359 A1 * | 7/2005 | Giesberts | H04L 1/0083 | 370/389 |
| 2005/0169270 A1 | 8/2005 | Mutou et al. | | |
| 2005/0220145 A1 * | 10/2005 | Nishibayashi | H04W 99/00 | 370/474 |
| 2005/0226201 A1 * | 10/2005 | McMillin | H04L 45/00 | 370/348 |
| 2005/0232183 A1 | 10/2005 | Sartori et al. | | |
| 2005/0237956 A1 | 10/2005 | Kuperschmidt et al. | | |
| 2005/0238016 A1 * | 10/2005 | Nishibayashi | H04L 1/1614 | 370/389 |
| 2005/0238456 A1 | 10/2005 | Sung et al. | | |
| 2005/0243835 A1 | 11/2005 | Sharma et al. | | |
| 2005/0259650 A1 | 11/2005 | Bronner et al. | | |
| 2005/0265302 A1 * | 12/2005 | Nishibayashi | H04L 45/00 | 370/349 |
| 2006/0018268 A1 * | 1/2006 | Kakani et al. | | 370/278 |
| 2006/0029002 A1 * | 2/2006 | Park | H04L 29/12009 | 370/254 |
| 2006/0029099 A1 * | 2/2006 | Jang | H04W 28/06 | 370/473 |
| 2006/0034278 A1 | 2/2006 | Hundscheidt et al. | | |
| 2006/0050661 A1 * | 3/2006 | Shim | H04W 28/18 | 370/318 |
| 2006/0056362 A1 * | 3/2006 | Jang | H04L 47/10 | 370/336 |
| 2006/0072543 A1 | 4/2006 | Lloyd et al. | | |
| 2006/0077993 A1 | 4/2006 | Pereira et al. | | |
| 2006/0078001 A1 * | 4/2006 | Chandra | H04L 12/46 | 370/473 |
| 2006/0080455 A1 * | 4/2006 | Das | H04L 69/32 | 709/231 |
| 2006/0083233 A1 * | 4/2006 | Nishibayashi | H04L 1/1621 | 370/389 |
| 2006/0092871 A1 | 5/2006 | Nishibayashi et al. | | |
| 2006/0136614 A1 * | 6/2006 | Kakani | H04L 1/1614 | 710/30 |
| 2006/0171406 A1 | 8/2006 | Kwon et al. | | |
| 2006/0245488 A1 * | 11/2006 | Puputti | H04H 20/72 | 375/238 |
| 2006/0250999 A1 * | 11/2006 | Zeng | H04L 12/189 | 370/312 |
| 2006/0252443 A1 * | 11/2006 | Sammour | H04W 4/08 | 455/518 |
| 2006/0264172 A1 | 11/2006 | Izumikawa et al. | | |
| 2006/0268823 A1 | 11/2006 | Kim et al. | | |
| 2006/0291461 A1 * | 12/2006 | Stephens | | 370/389 |
| 2007/0070905 A1 | 3/2007 | Oliver et al. | | |
| 2007/0072604 A1 | 3/2007 | Wang | | |
| 2007/0073805 A1 | 3/2007 | Jorgensen | | |
| 2007/0104131 A1 | 5/2007 | Puthenkulam et al. | | |
| 2007/0104162 A1 * | 5/2007 | Kneckt | H04W 72/1221 | 370/338 |
| 2007/0115828 A1 * | 5/2007 | Ahuja | H04L 45/05 | 370/236 |
| 2007/0116009 A1 | 5/2007 | Kangru et al. | | |
| 2007/0142064 A1 | 6/2007 | Gutowski | | |
| 2007/0159983 A1 * | 7/2007 | Eglin | H04L 45/00 | 370/254 |
| 2007/0160213 A1 | 7/2007 | Un et al. | | |
| 2007/0162610 A1 | 7/2007 | Un et al. | | |
| 2007/0183457 A1 * | 8/2007 | Leitch | H04L 45/00 | 370/498 |
| 2007/0195768 A1 * | 8/2007 | Kanazawa | H04L 45/00 | 370/390 |
| 2007/0206545 A1 | 9/2007 | Lee et al. | | |
| 2007/0211625 A1 * | 9/2007 | Liu | H04L 47/10 | 370/229 |
| 2007/0217364 A1 | 9/2007 | Kawakami | | |
| 2007/0237120 A1 * | 10/2007 | Xu | H04W 72/1289 | 370/338 |
| 2007/0249347 A1 | 10/2007 | Saifullah et al. | | |
| 2007/0291679 A1 * | 12/2007 | Kawakami | H04L 45/48 | 370/328 |
| 2008/0002599 A1 * | 1/2008 | Yau | H04L 45/36 | 370/310 |
| 2008/0049654 A1 * | 2/2008 | Otal | H04W 28/06 | 370/311 |
| 2008/0101290 A1 | 5/2008 | Sung et al. | | |
| 2008/0130549 A1 | 6/2008 | Chindapol et al. | | |
| 2008/0151802 A1 | 6/2008 | Sheu et al. | | |
| 2008/0165670 A1 | 7/2008 | Tao et al. | | |
| 2008/0165776 A1 | 7/2008 | Tao et al. | | |
| 2008/0170531 A1 | 7/2008 | Petry et al. | | |
| 2008/0212513 A1 | 9/2008 | Tao et al. | | |
| 2008/0267110 A1 | 10/2008 | Cai et al. | | |
| 2008/0285501 A1 * | 11/2008 | Zhang | H04L 45/20 | 370/315 |
| 2008/0298250 A1 | 12/2008 | Larsson | | |
| 2009/0003267 A1 | 1/2009 | Ramachandran et al. | | |
| 2009/0016290 A1 | 1/2009 | Chion et al. | | |
| 2009/0074189 A1 | 3/2009 | Ryu et al. | | |
| 2009/0141668 A1 * | 6/2009 | Zhang et al. | | 370/315 |
| 2009/0147731 A1 | 6/2009 | Chion et al. | | |
| 2009/0220085 A1 | 9/2009 | Tao et al. | | |
| 2009/0238208 A1 * | 9/2009 | Naka | H04L 1/0007 | 370/470 |
| 2010/0309792 A1 | 12/2010 | Wang et al. | | |
| 2010/0309858 A1 | 12/2010 | Chen et al. | | |
| 2011/0010610 A1 | 1/2011 | Boariu et al. | | |
| 2013/0016651 A1 * | 1/2013 | Zhang et al. | | 370/315 |

OTHER PUBLICATIONS

Office Action issued in U.S. Appl. No. 12/299,790, filed Nov. 16, 2011; 19 pages.

Office Action issued in U.S. Appl. No. 12/299,790, filed Aug. 27, 2012; 17 pages.

Office Action issued in U.S. Appl. No. 12/299,790, filed Mar. 7, 2013; 17 pages.

Notice of Allowance issued in U.S. Appl. No. 12/299,790, filed Aug. 7, 2013; 10 pages.

Ad-hoc Meeting Report—"Mobile Multi-hop Relay Networking" in IEEE 802.16 (Chair: Mitsua Nohara; Jan. 6, 2006); website: http://www.ieee802/org/16/docs/05/80216-05_051.pdf (see p. 9).

Carl Eklund et al.; "A Technical Overview of the WirelessMAN Air Interface for Broadband Wireless Access"; IEEE Standard 802.16;

(56) References Cited

OTHER PUBLICATIONS website: http://ieee802.org/16/docs/02/C80216-02_05.pdf (see p. 103, subsection: Transmission of MAC PDUs).

International Search Report and Written Opinion dated Sep. 24, 2007 for International Application No. PCT/CA2007/000839; International Filing Date May 11, 2007 (11 pages).

* cited by examiner

| Name | Size (bit) | Description |
|---|---|---|
| Control | 1 | 1: The number of MAC PDUs and corresponding QoS fields included<br>0: length field and one QoS field included |
| If control == =1<br>{Number MAC PDUs (N) | 8 | Indicates the number of Mac PDUs from/to a destination RN |
| N occurrences of QoS fields} | 8N | One Qos corresponding to one MAC PDU |
| Else{<br>Length | 16 | Indicates the length of payload part from/to destination a RN |
| QoS} | 8 | QoS corresponding to the payload part from/to destination MS/BS |
| Number RS IDs (N) | 4 | Indicates the number of RS IDs (in the forwarding path) included in this sub-header in the order from the next hop RS ID to the destination RS ID<br>If the number of Rs node ID is 1, the RN is the destination RN |
| N occurrences of relay node ID fields | 8N | One RS ID field indicates 8-bit RSID |

*FIG. 11*

MEDIA ACCESS CONTROL PROTOCOL FOR MULTI-HOP NETWORK SYSTEMS AND METHOD THEREFOR

The present patent application claims the benefit of U.S. patent application Ser. No. 12/299,790, filed on Nov. 6, 2008 which is a National Phase Entry of International Application Number PCT/CA2007/000839 filed May 5, 2007, that claims the benefit of U.S. Provisional Patent Application Ser. No. 60/746,996, filed on Nov. 5, 2006, U.S. Provisional Patent Application Ser. No. 60/820,510, filed on Jul. 27, 2006, U.S. Provisional Patent Application Ser. No. 60/868,444, filed on Dec. 4, 2006, U.S. Provisional Patent Application Ser. No. 60/868,441, filed on Dec. 4, 2006, and U.S. Provisional Patent Application Ser. No. 60/892,549, filed on Mar. 2, 2007, the entire contents of the forgoing applications are incorporated herein by reference.

FIELD OF THE INVENTION

The present invention relates to the field of wireless communications and more particularly to a multi-hop network method and system using an efficient MAC protocol.

BACKGROUND OF THE INVENTION

As the demand for high speed broadband networking over wireless communication links increases, so too does the demand for different types of networks that can accommodate high speed wireless networking. For example, the deployment of IEEE 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extended through other technologies such as cellular technology, data throughput using current cellular technologies is limited to a few MB/sec. Put simply, as the distance from the base station increase, the need for higher transmission power increases and the maximum data rate typically decreases. As a result, there is a need to support high speed wireless connectivity beyond a short distance such as within a home or office.

As a result of the demand for longer range wireless networking, the IEEE 802.16 standard was developed. The IEEE 802.16 standard is often referred to as WiMAX or less commonly as WirelessMAN or the Air Interface Standard. This standard provides a specification for fixed broadband wireless metropolitan access networks ("MAN"s) that use a point-to-multipoint architecture. Such communications can be implemented, for example, using orthogonal frequency division multiplexing ("OFDM") communication. OFDM communication uses a spread spectrum technique distributes the data over a large number of carriers that are spaced apart at precise frequencies. This spacing provides the "orthogonality" that prevents the demodulators from seeing frequencies other than their own.

The 802.16 standard supports high bit rates in both uploading to and downloading from a base station up to a distance of 30 miles to handle such services as VoIP, IP connectivity and other voice and data formats. Expected data throughput for a typical WiMAX network is 45 MBits/sec. per channel. The 802.16e standard defines a media access control ("MAC") layer that supports multiple physical layer specifications customized for the frequency band of use and their associated regulations. However, the 802.16e standard does not provide support for multi-hop networks.

802.16 networks, such as 802.16j networks, can be deployed as multi-hop networks from the subscriber equipment to the carrier base station. In other words, in multi-hop networks, the subscriber device can communicate with the base station directly or through an intermediate device.

The complexity involved in supporting multi-hop networks in a robust manner necessarily involves sophisticated MAC control layer protocols. Such protocols do not exist. For example, as noted above, the IEEE 802.16e standard does not support multi-hop networks. The IEEE 802.16j standard for supporting multi-hop networks has been proposed, but the standard currently makes no provision for efficient use of MAC layer resources. As such, MAC protocol data units ("PDUs") in a multi-hop environment are not arranged to minimize overhead or provide efficient means for relaying control information. For example, current methods do not allow MAC PDUs for multiple connections associated with different users to be grouped into a single relay packet. As another example, current methods do not define how route control or quality of service ("QoS") control within a multi-hop communication network can be supported in centralized or decentralized manners.

It is therefore desirable to have method and system that provides MAC PDU arrangements that allow efficient use of MAC layer resources in supporting wireless multi-hop relay networks, including but not limited to those operating in accordance with the IEEE 802.16 standards.

SUMMARY OF THE INVENTION

The present invention advantageously provides a method and system for wireless communication using relay nodes. Traffic forwarding control, such as routing control and QoS control can be centralized or decentralized. Arrangements for security and the suppression of transmission of redundant information are also provided.

In accordance with one aspect, the present invention provides a method for wireless communication in which a plurality of media access control ("MAC") packet data units ("PDUs") corresponding to a plurality of wireless communication connections are received. The plurality of MAC PDUs is grouped into a relay packet and the relay packet is transmitted.

In accordance with another aspect, the present invention provides a system for wireless communication in which the system includes at least one relay node. The relay node is arranged to receive a plurality of media access control ("MAC") packet data units ("PDUs") corresponding to a plurality of wireless communication connections, group the plurality of MAC PDUs into a relay packet and transmit the relay packet.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 11 is a block diagram of an exemplary combined forwarding QoS and route sub-header constructed in accordance with the principles of the present invention.

DETAILED DESCRIPTION OF THE INVENTION

It is noted that various multi-hop communication schemes are described herein in accordance with the present invention. While described in the context of the Institute of Electrical and Electronics Engineers ("IEEE") 802.16 standards, one of ordinary skill in the art will appreciate that the broader inventions described herein are not limited in this regard and merely for exemplary and explanatory purposes.

According to the present invention, various media access control ("MAC") layer designs for downlink communications between a base station ("BS") and a relay station ("RS") and between a RS and RS are described. One of ordinary skill in the art will appreciate that the invention described herein is not limited solely to use with downlink communications but is equally applicable to uplink communications as well, for example between a mobile station ("MS") and RS, a RS and RS, and a RS and BS.

According to one embodiment of the invention a Relay Station MAC (R-MAC) layer is introduced. According to another embodiment the existing IEEE 802.16e MAC is modified to implement and support the features and functions described herein.

Figure 1:
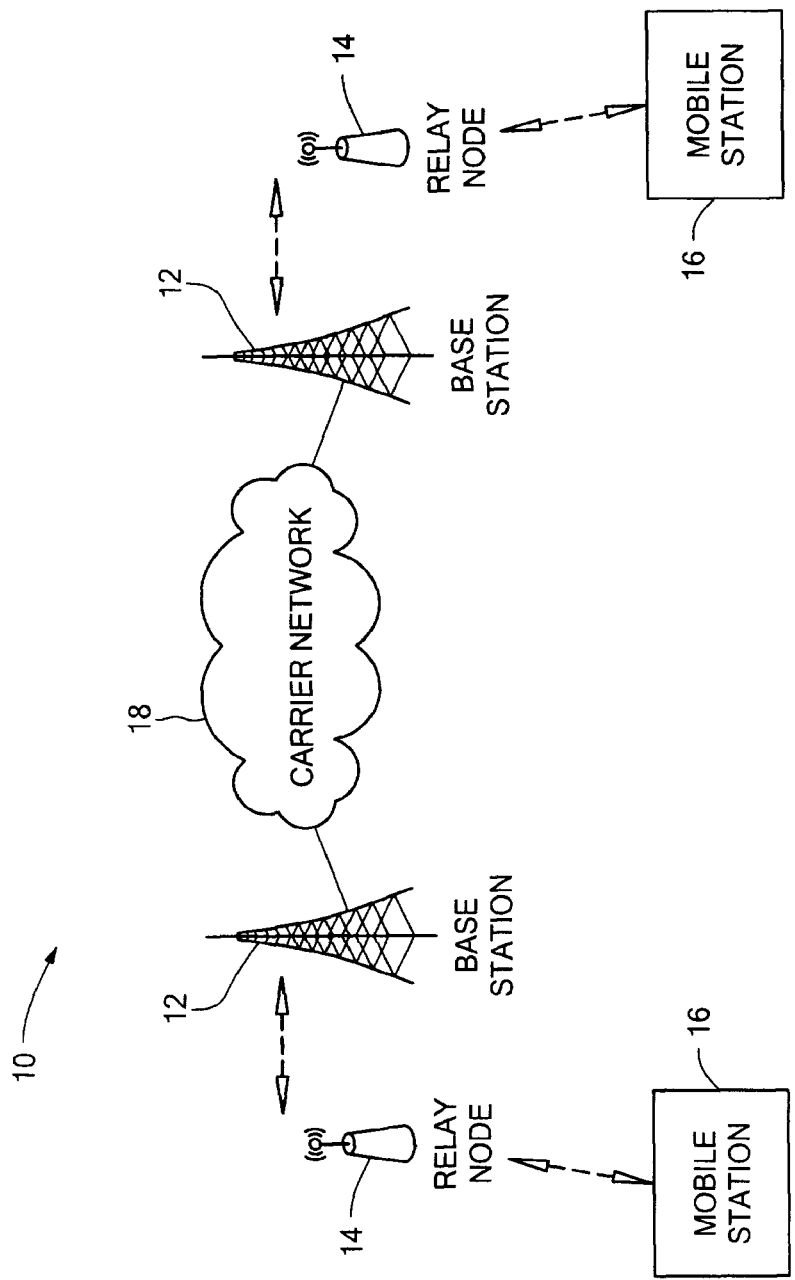
FIG. 1 is a diagram of an embodiment of a system constructed in accordance with the principles of the present invention.

Referring now to the drawing figures in which like reference designators refer to like elements, there is shown in FIG. 1, a system constructed in accordance with the principles of the present invention and designated generally as "10." System 10 includes base stations 12, relay nodes 14 and mobile stations 16. Base stations 12 communicate with one another and with external networks, such as the Internet (not shown), via carrier network 18. Base stations 12 engage in wireless communication with relay nodes 14 and/or mobile stations 16. Similarly, mobile stations 16 engage in wireless communication with relay nodes 14 and/or base stations 12.

Base station 12 can be any base station arranged to wirelessly communicate with relay nodes 14 and/or mobile stations 16. Base stations 12 include the hardware and software used to implement the functions described herein to support the MAC control plane functions. Base stations 12 include a central processing unit, transmitter, receiver, I/O devices and storage such as volatile and nonvolatile memory as may be needed to implement the functions described herein. Base stations 12 are described in additional detail below.

Mobile stations 16, also described in detail below, can be any mobile station including but not limited to a computing device equipped for wireless communication, cell phone, wireless personal digital assistant ("PDA") and the like. Mobile stations 16 also include the hardware and software suitable to support the MAC control plane functions needed to engage in wireless communication with base station 12 either directly or via a relay node 14. Such hardware can include a receiver, transmitter, central processing unit, storage in the form of volatile and nonvolatile memory, input/output devices, etc.

Relay node 14 is used to facilitate wireless communication between mobile station and base station 12 in the uplink (mobile station 16 to base station 12) and/or the downlink (base station 12 to mobile station 16). A relay node 14 configured in accordance with the principles of the present invention includes a central processing unit, storage in the form of volatile and/or nonvolatile memory, transmitter, receiver, input/output devices and the like. Relay node 14 also includes software to implement the MAC control functions described herein. Of note, the arrangement shown in FIG. 1 is general in nature and other specific communication embodiments constructed in accordance with the principles of the present invention are contemplated.

Although not shown, system 10 includes a base station controller ("BSC") that controls wireless communications within multiple cells, which are served by corresponding base stations ("BS") 12. In general, each base station 12 facilitates communications using OFDM with mobile stations 16, which are within the cell 12 associated with the corresponding base station 12. The movement of the mobile stations 16 in relation to the base stations 12 results in significant fluctuation in channel conditions. It is contemplated that the base stations 12 and mobile stations 16 may include multiple antennas in a multiple input multiple output ("MIMO") arrangement to provide spatial diversity for communications.

A high level overview of the mobile stations 16 and base stations 12 of the present invention is provided prior to delving into the structural and functional details of the preferred embodiments. It is understood that relay nodes 14 can incorporate those structural and functional aspects described herein with respect to base stations 12 and mobile stations 16 as may be needed to perform the functions described herein.

Figure 2:
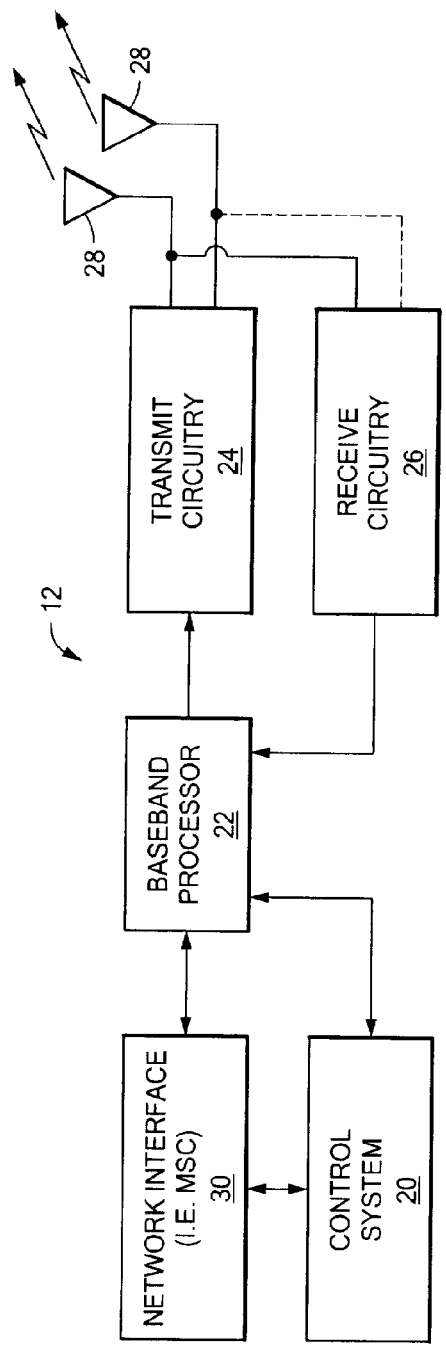
FIG. 2 is a block diagram of an exemplary base station constructed in accordance with the principles of the present invention.

With reference to FIG. 2, a base station 12 configured according to one embodiment of the present invention is illustrated. The base station 12 generally includes a control system 20 such as a central processing unit, a baseband processor 22, transmit circuitry 24, receive circuitry 26, multiple antennas 28, and a network interface 30. The receive circuitry 26 receives radio frequency signals bearing information from one or more remote transmitters provided by mobile stations 16 (illustrated in FIG. 3). Preferably, a low noise amplifier and a filter (not shown) cooperate to amplify and remove out-of-band interference from the signal for processing. Down conversion and digitization circuitry (not shown) then down converts the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors ("DSPs") or application-specific integrated circuits ("ASICs"). The received information is then sent across a wireless network via the network interface 30 or transmitted to another mobile station 16 serviced by the base station 12.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 28 through a matching network (not shown). Modulation and processing details are described in greater detail below.

Figure 3:
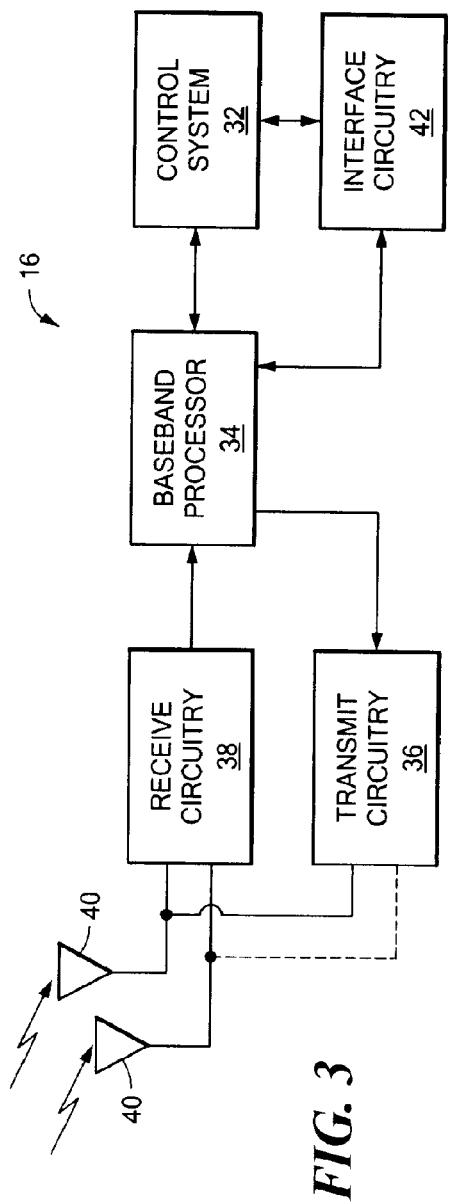
FIG. 3 is a block diagram of an exemplary mobile station constructed in accordance with the principles of the present invention.

With reference to FIG. 3, a mobile station 16 configured according to one embodiment of the present invention is described. Similar to base station 12, a mobile station 16 constructed in accordance with the principles of the present invention includes a control system 32, a baseband processor 34, transmit circuitry 36, receive circuitry 38, multiple antennas 40, and user interface circuitry 42. The receive circuitry 38 receives radio frequency signals bearing information from one or more base stations 12. Preferably, a low noise amplifier and a filter (not shown) cooperate to amplify and remove out-of-band interference from the signal for processing. Down conversion and digitization circuitry (not shown) then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors ("DSPs") and application specific integrated circuits ("ASICs").

With respect to transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation is implemented, for example, through the performance of an Inverse Fast Fourier Transform ("IFFT") on the information to be transmitted. For demodulation, a Fast Fourier Transform ("FFT") on the received signal is performed to recover the transmitted information. In practice, the IFFT and FFT are provided by digital signal processing carrying out an Inverse Discrete Fourier Transform (IDFT) and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 12 to the mobile stations 16 via relay nodes 14. Each base station 12 is equipped with n transmit antennas 28, and each mobile station 16 is equipped with m receive antennas 40. Relay nodes 14 can include multiple transmit and receive antennas as well. Notably, the respective antennas can be used for reception and transmission using appropriate duplexers or switches and are so labeled only for clarity.

Figure 4:
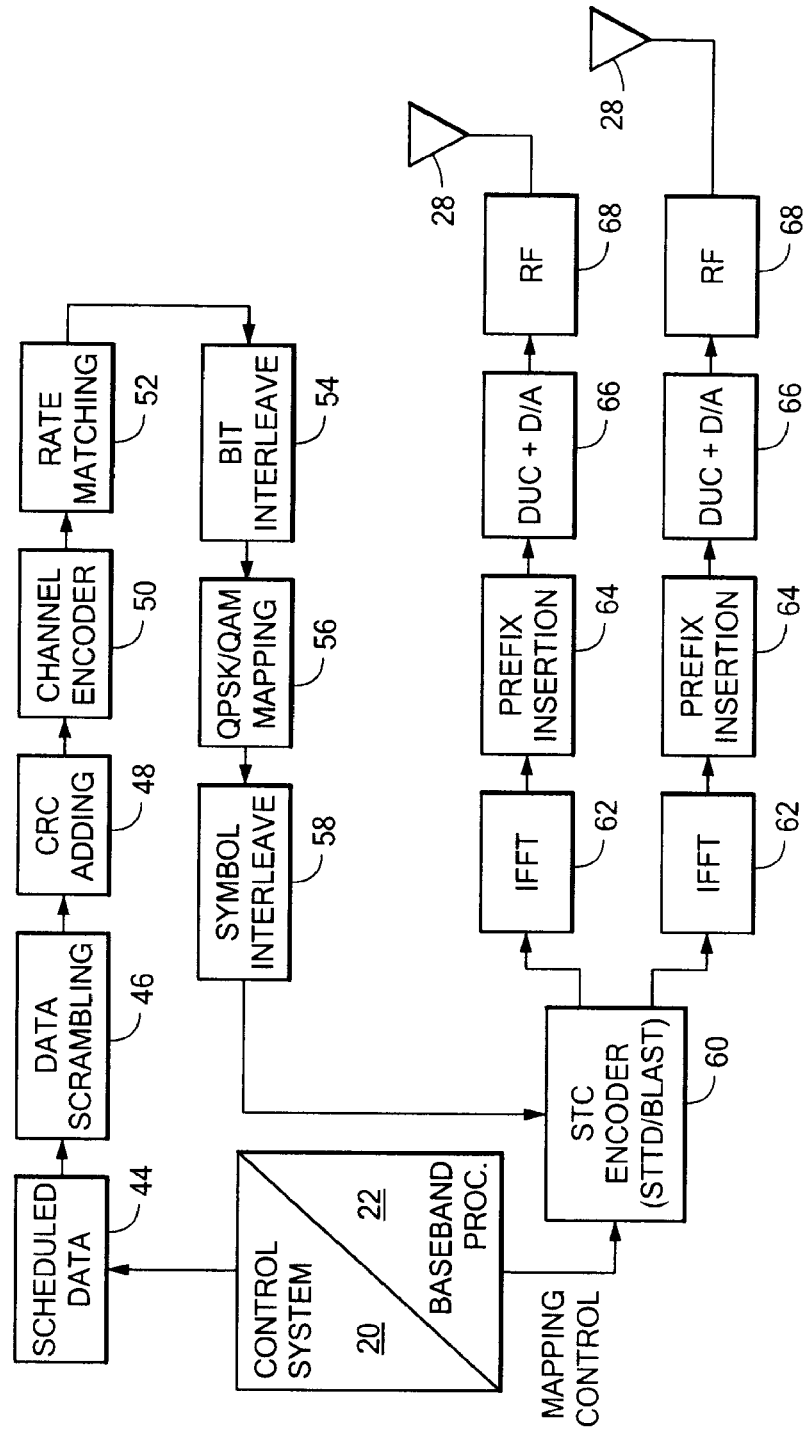
FIG. 4 is a block diagram of an exemplary OFDM architecture constructed in accordance with the principles of the present invention.

With reference to FIG. 4, a logical OFDM transmission architecture is described according to one embodiment. Initially, the base station controller 10 sends data to be transmitted to various mobile stations 16 to the base station 12. The base station 12 may use the channel quality indicators ("CQIs") associated with the mobile stations to schedule the data for transmission as well as select appropriate coding and modulation for transmitting the scheduled data. The CQIs may be provided directly by the mobile stations 16 or determined at the base station 12 based on information provided by the mobile stations 16. In either case, the CQI for each mobile station 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile station 16. Again, the channel coding for a particular mobile station 16 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile station. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code ("STC") encoder logic 60, which modifies the symbols in a fashion making the transmitted signals more resistant to interference and more readily decoded at a mobile station 16. The STC encoder logic 60 will process the incoming symbols and provide n outputs corresponding to the number of transmit antennas 28 for the base station 12. The control system 20 and/or baseband processor 22 will provide a mapping control signal to control STC encoding. At this point, assume the symbols for the n outputs are representative of the data to be transmitted and capable of being recovered by the mobile) station 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 12 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion ("DUC") and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile station 16 are scattered among the sub-carriers. The mobile station 16, which is discussed in detail below, will use the pilot signals for channel estimation.

Figure 5:
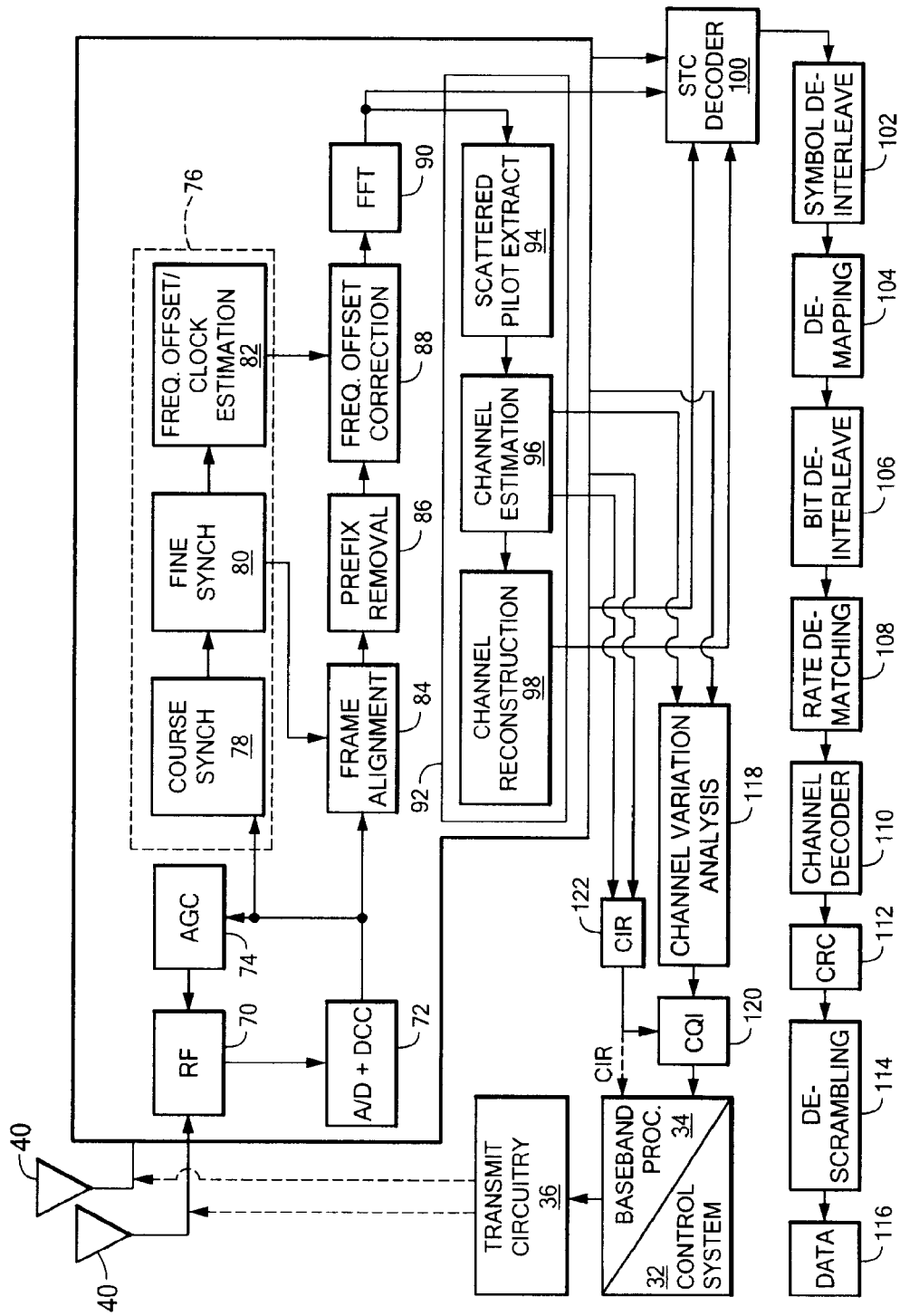
FIG. 5 is a block diagram of the flow of received signal processing in accordance with the principles of the present invention.

Reference is now made to FIG. 5 to illustrate reception of the transmitted signals by a mobile station 16. Upon arrival of the transmitted signals at each of the antennas 40 of the mobile station 16, the respective signals are demodulated and amplified by corresponding RF circuitry 70. For the sake of conciseness and clarity, only one of the two receive paths is described and illustrated in detail. Analog-to-digital ("A/D") converter and down-conversion circuitry 72 digitizes and downconverts the analog signal for digital processing. The resultant digitized signal may be used by automatic gain control circuitry ("AGC") 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
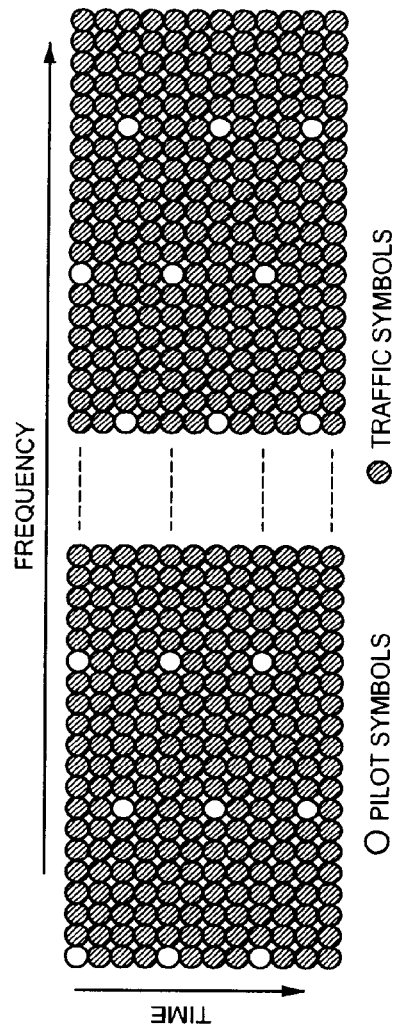
FIG. 6 is a diagram of an exemplary scattering of pilot symbols among available sub-carriers.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Referring again to FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

Figure 7:
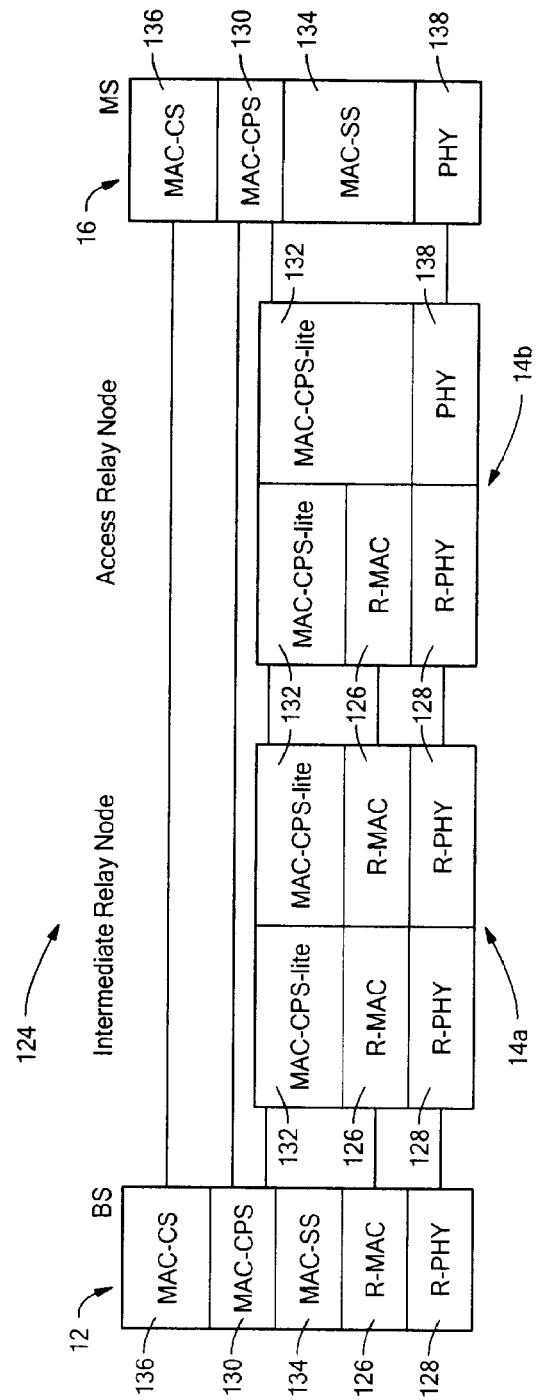
FIG. 7 is a block diagram of an embodiment of a MAC layer protocol stack constructed in accordance with the principles of the present invention.

FIG. 7 shows a protocol stack 124 for an embodiment of the invention where an R-MAC layer is introduced to facilitate (1) packing multiple MAC PDUs from one CID into one R-MAC PDU for optional 16e GMH suppression, (2) packing multiple MAC PDUs from multiple mobile stations 16 supported by one RS into one R-MAC PDU to reduce overhead, (3) packing multiple MAC PDUs from multiple mobile stations 16 supported by multiple RS into one R-MAC PDU to reduce overhead, and (4) packing multiple MAC PDUs for multiple MSs supported by the same RS into one R-MAC PDU to reduce overhead.

As is shown, re-fragmentation can be performed at a relay node 14 for transmission between relay node 14 and mobile stations 16. FIG. 7 shows the protocol for relaying traffic to a mobile station 16 MS traffic relaying where mobile station 16 connection and privacy management are performed on an end-to-end basis. This scenario assumes a transmission passed between base station 12 and mobile station 16, and provides two relay nodes, namely relay nodes 14a and relay node 14b in the path. Of note, relay nodes 14a and 14b are referred to collectively herein as relay node(s) 14. As such, the diagram in FIG. 7 shows a relay node hop between base station 12 and mobile station 16. As is seen in FIG. 7, this arrangement includes a MAC layer for facilitating relay data plane functions (defined and described herein as the "R-MAC" layer). It is this R-MAC layer 126 that provides scheduling, flow and routing control as well as re-fragmentation. R-MAC layer 126 is applicable to the links between base stations 12 and relay stations 14, as well as between relay stations 14. Of note, although shown as R-PHY 128 in FIG. 7, for pure physical layer relaying, the physical layer protocol is the same as current protocols, e.g., the IEEE 802.16d/e protocol stack. R-PHY 128 is used for the convenience of indicating that the physical layer communication is between base station 12 and relay node 14 or between relay nodes 14.

As is seen in FIG. 7, security at the MAC layer is initiated at base station 14. Relay nodes 14 include physical layer 128 and R-MAC layer 126. Base stations 12 and mobile stations 16 also include a MAC common process sub-layer ("CPS") 130 for communicating MAC management messages. Relay nodes 14 can implement CPS 130 (not shown) or a sub-set of the CPS 130, shown as CPS-lite 132 in FIG. 7. CPS-lite 132 includes support for functions such as process (sharing) of MAC management messages between base station 12 and mobile station 16, scheduling on the access link, etc. Base station 12 and mobile station 16 include a MAC security sub-layer ("MAC-SS") 134 which provides end-to-end security. Convergence sub-layer ("MAC-CS") 136 is also provided by base stations 12 and mobile stations 16. Arrangements for providing MAC-SS 134, MAC-CS 136, R-PHY 126 as well as general physical layer ("PHY") 138 for physical layer communication between relay nodes 14 and mobile stations 14 are known in the art and are not explained herein.

Figure 8:
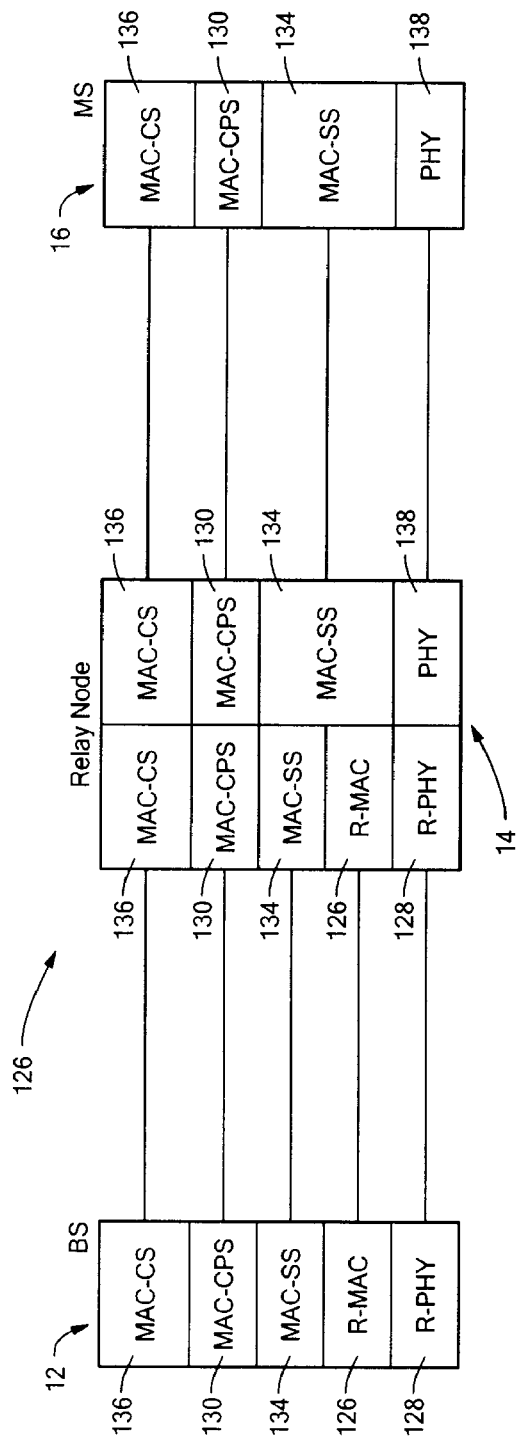
FIG. 8 is a block diagram of another embodiment of a MAC layer protocol stack constructed in accordance with the principles of the present invention.

An alternative protocol stack embodiment constructed in accordance with the principles of the present invention is shown in FIG. 8. As is shown in FIG. 8, relay nodes 14 can optionally implement R-MAC sub-layer 126, an 802.16e MAC CPS 130 sub-layer such as an IEEE 802.16e CPS sub-layer, and MAC CS 136 sub-layer. In accordance with this embodiment, the protocol for traffic relay is arranged such that mobile station 16 connection and privacy management are managed by relay node 14 and the relay node 14 connection and privacy management are controlled by base station 12.

It is contemplated that a relay node 14 can implement a variety of different protocol layers. For example, relay node 14 can implement only the R-PHY 128 layer on the relay node 14 to relay node 14 ("R-link") and the traditional IEEE 802.16e protocol PHY 138 on the relay node 14 to mobile station 16 access link. As another option, relay node 14 can implement only R-PHY 128 and R-MAC 126 layers on the R-link. As still another option, relay node 14 can implement the R-PHY 128, R-MAC 126 and MAC-CPS 130 layers on the R-link. Finally, relay node 14 can implement the R-PHY 128, R-MAC 126, MAC-SS 134, MAC-CPS 130 (or MAC-CPS lite 132) and MAC-CS 136 layers on the R-link.

It is contemplated that R-MAC PDU formats can be implemented in accordance with various embodiments of the present invention. For example, an R-MAC PDU can include a 2 bit control field, where the first bit is a type field in which a "1" indicates the PDU is a control header only (without payload) and a "0" indicates that there is a traffic payload. The second bit can be a receiving relay node ID ("RSID") indicator in which a "1" indicates that a receiving relay node 14 ID is included and a "0" indicates that a receiving relay node 14 ID is not included. The RSID may be used to indicate the relay node 14 (also referred to herein as "relay station" 14) that is to receive the R-MAC PDU. A length field indicates the total length of the R-MAC PDU. It is contemplated that the same format for same type of control fields and sub-header can be used.

The R-MAC layer of the present invention provides an extendable framework for various relay related functions, such as QoS control, routing control and etc. An R-MAC PDU may include an R-MAC header, followed by zero or some number of R-MAC sub-headers, with or without an R-MAC payload. The R-MAC payload can include either relay node 14 related control messages or MAC PDUs such as IEEE 802.16e MAC PDUs. Although the term "sub-header" is used herein, the invention is not limited solely to the use of "sub-headers". Any suitable arrangement for carrying the information, whether as a sub-header, field, header, etc, can be used.

Figure 9:
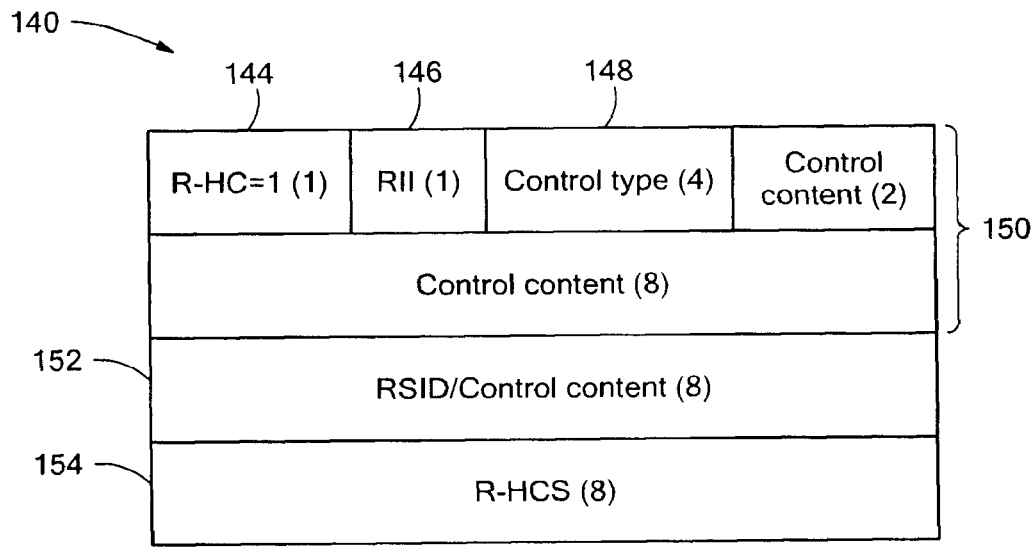
FIG. 9 is a block diagram of an exemplary relay MAC ("R-MAC") header format constructed in accordance with the principles of the present invention.
Figure 10:
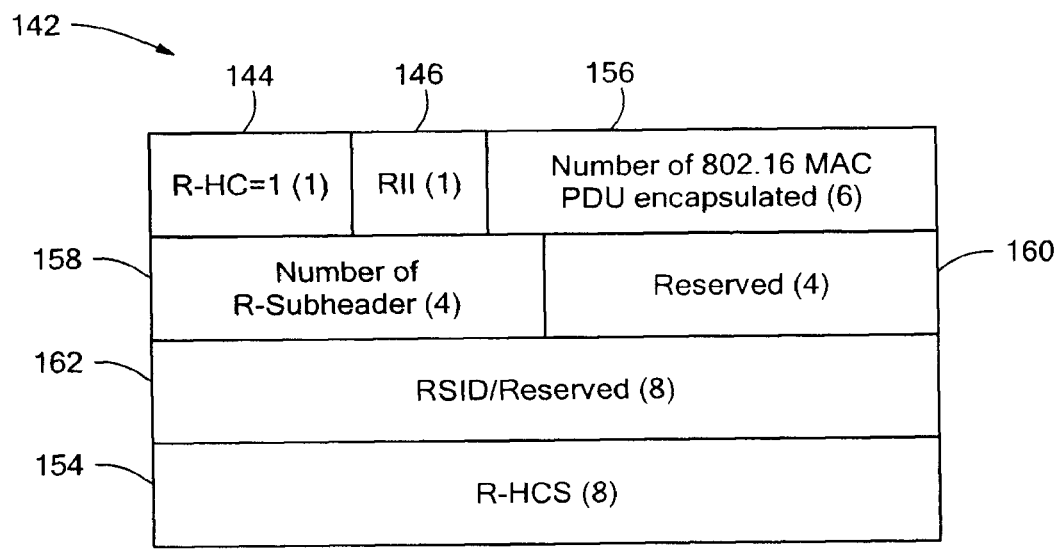
FIG. 10 is a block diagram of another exemplary R-MAC header format constructed in accordance with the principles of the present invention.

Two exemplary R-MAC header formats are shown and described with reference to the diagrams of FIGS. 9 and 10. FIG. 9 shows "Type 1" R-MAC header 140. R-MAC header 140 is a control header. As such, the corresponding R-MAC PDU contains a header but no payload is included. FIG. 10 shows "Type 2" R-MAC header 142. R-MAC header 142 can be used for data forwarding. Corresponding R-MAC PDUs with a payload may include type 2 R-MAC header 142 which may include one or more R-Sub-header(s).

Referring to FIG. 9, the fields of Type 1 R-MAC header 140 are explained. R-MAC header control ("R-HC") field 144 is a single bit field defining the type of R-MAC header. A "1" indicates that the R-MAC header is a Type 1 header while a "0" indicates that the R-MAC header is a Type 2 header.

RSID inclusion indicator ("RII") field 146 is a single bit field that indicates whether or not an RSID is included in the R-MAC header 140 (or 142). A "1" indicates that an RSID is included while a "0" indicates that an RSID is not included. Control type field 148 is a 4 bit field that indicates the control type. Control content field 150 is a 10 bit field that contains the control information corresponding to the type indicated in control content field 148. RSID/control content field 152 is an 8 bit field. If RII field 146 is "1", RSID/control content field 152 contains the RSID. If RII field 146 is "0", RSID/control content field 152 contains the control content corresponding to the type indicated in content field 148. R-MAC header check sequence field 154 is an 8 bit field with a check sequence.

Differences between the format of Type 1 R-MAC header 140 and Type 2 R-MAC header 142 are described with reference to FIG. 10. Number of encapsulated MAC PDUs field 156 is a 6 bit field that indicates the number of MAC PDUs, such as the number of IEEE 802.16e MAC PDUs encapsulated in the payload. Number of R-sub-headers field 158 is a 4 bit field indicating the quantity of R-sub-headers following the R-MAC header 142. Four bit field 160 is reserved for future use as the use of R-MAC headers develops. RSID/reserved field 162 is an 8 bit field. If RII field 146 is "1", field 162 includes the RSID. If RII field 146 is "0", field 162 is not used and is reserved for future use. It is noted that field arrangements and lengths described with reference to FIGS. 9 and 10 are merely exemplary and that the fields can be arranged differently and/or have lengths other than those described herein.

The present invention provides for a variety of different arrangements for controlling relay packets via traffic control, i.e., routing and QoS control. In accordance with one arrangement, decentralized routing and QoS control are provided. Under this arrangement, each forwarding relay node 14 stores and maintains QoS by connection ID assigned to the connection between base station 12 and mobile station 16 as well as a route table (by CID). No control field or sub-header field is used since the relay node 14 maintains the information that would have been present in these fields and sent by base station 12 in a centralized arrangement.

In accordance with a second arrangement, QoS control is centralized in base station 14 while route control remains decentralized as described above. Here, the forwarding relay node 14 stores and maintains only a route table at the connection level (CID). Here, a forwarding QoS sub-header can be used. One sub-header may be used for one group of MAC PDUs to/from a relay node 14. When more than one group is encapsulated, multiple sub-headers can be used. An exemplary traffic control (forwarding QoS) sub-header supporting grouping can include a field indicating the quantity of MAC PDUs to follow along with the number of MAC PDUs indicated in the quantity field. Each PDU includes a QoS field corresponding to that encapsulated MAC PDU. If only one QoS field is included, this indicates that there is either only one encapsulated MAC PDU or that the QoS field is applicable to all encapsulated MAC PDUs. It is noted that the QoS field defines the deadline or other QoS related information for transmission to the destination mobile station 16.

A number of different exemplary embodiments are contemplated for implementing decentralized, i.e., distributed, routing control. One example uses mobile station 14 CID-based routing. In accordance with this example, each relay node 14 maintains a routing table to include as entries all CIDs to be relayed. Each CID is associated with a "next hop RSID". For each received downlink ("DL") MAC PDU, relay node 14 checks the CID through the header of MAC PDU and then delivers the MAC PDU to the next hop relay node corresponding the CID in the routing table. In this example, no modification of the existing IEEE 802.16e MAC is required.

As another example of decentralized routing control, routing control can be provided based on the destination RSID or destination CID. In this case, the destination RSID is the ID of the relay node 14 that is the destination of a forward path. Similarly, the destination CID is the basic CID of the relay node 14 that is the destination of a forward path. The destination RSID/CID is carried together along with a MAC PDU. Thus, a destination RSID/CID sub-header is used. Each relay node 14 stores and maintains a routing table to include a RSID/CID (destination RSID/CID) as entries. Each destination RSID/CID is associated with a "next hop RSID". For each received downlink MAC PDU, the relay node 14 checks the destination RSID/CID sub-header and then delivers the MAC PDU to the next hop relay node 14 corresponding to this destination RSID/CID in the routing table.

As still another example of decentralized routing control, routing control can be provided based on the tunnel CID ("T-CID") defined for a tunnel connection between base station 12 and relay node 14 carrying IEEE 802.16e MAC PDUs. Each T-CID is associated with a particular route and a set of QoS parameters.

The T-CID information is carried along with a MAC PDU. Thus, a T-CID sub-header is used. The sub-header is provided such that it can support the transport of the T-CID information. Each relay node 14 stores and maintains a routing table having T-CIDs as entries. Each T-CID is associated with a "next hop RS" field. After a relay node 14 receives a MAC PDU, the relay node 14 checks the T-CID information and forwards this MAC PDU to the next hop relay node 14 corresponding to this T-CID in the routing table.

For centralized, QoS control, the present invention provides for source-based QoS control. In the downlink, base station 12 sends the QoS information along with a downlink MAC PDU to instruct relay nodes 14 in the downstream forwarding path how to relay this MAC PDU. In the uplink, the access relay node 14, i.e., the relay node 14 receiving MAC PDUs from a mobile station 16, sends the QoS information along with an uplink MAC PDU to instruct relay nodes 14 in the upstream forwarding path how to relay this MAC PDU. Thus a QoS sub-header such as that described above is used. For source-based QoS control, relay nodes 14 do not store or maintain QoS related information. After a relay node 14 receives a MAC PDU, the relay node 14 checks the QoS information received along with this MAC PDU and schedules further transmission of this MAC PDU in accordance with that QoS information.)

In accordance with a third arrangement, routing control is centralized within base station 12 but QoS control is decentralized and provided by forwarding relay node 14 as discussed above. This arrangement also allows hybrid route control in which the forwarding relay node 14 stores and maintains the QoS control table (by CID) as well as a route table at the relay node 14, i.e., by destination relay node 14. In this case, a forwarding route sub-header can be used in which one sub-header may be used for one group of MAC PDUs to/from one relay node 14. When more than one group of MAC PDUs is encapsulated, multiple such sub-headers may be used.

An exemplary traffic control (forwarding route) sub-header includes a field indicating the quantity of MAC PDUs from or destined to a relay node 14. Another field indicates the quantity of RSIDs in the forwarding path included in the sub-header ordered from next hop RSID to destination RSID. If the quantity is 1, the next hop is the destination RSID. The sub-header also includes a quantity of RSID fields equal to the value in the quantity of sub-headers field. By way of example, each RSID field can be an 8 bit field containing the subordinate RSID. Of note an RSID is assigned to a relay node 14 when that relay node 14 is registered within the system 10. Methods for assigning and maintaining RSID lists are known and are not described herein.

An exemplary embodiment for implementing centralized (source) routing control is arranged such that the source routing information includes one or multiple RSIDs of the relay nodes 14 in the forwarding path. The source routing information is carried along with a MAC PDU. Thus, a source routing sub-header such as that described above is used. It is noted that the relay nodes 14 do not maintain any routing table. For each received MAC PDU, a relay node 14 simply removes its own RSID in the source routing sub-header and forwards this MAC PDU to the next relay node 14 corresponding to the next RSID in the source routing sub-header.

MS CID based.

In accordance with the present invention, a number of different embodiments for implementing decentralized, i.e., distributed, QoS control is provided. As a first embodiment, distributed QoS control can be mobile station 16 CID based. In this case, each relay node 14 stores and maintains a QoS table having CIDs as entries. Each CID is associated with a set of QoS parameters. When a relay node 14 receives a MAC PDU, the relay node 14 checks the CID field and schedules further transmission based on the QoS parameters corresponding to this CID.

In accordance with a second embodiment, distributed QoS control can be T-CID based in which the T-CID information is transmitted along with a MAC PDU. Each relay node 14 stores and maintains a QoS table having T-CIDs as entries. Each T-CID is associated with a set of QoS parameters. When a relay node 14 receives a MAC PDU, the relay node 14 checks the T-CID field and schedules further transmission based on the QoS parameters corresponding to this T-CID.

In accordance with a fourth arrangement, both centralized/hybrid route and centralized QoS control are provided. In this case, forwarding relay nodes 14 need not store or maintain any table or may only store or maintain a route table at the relay node 14 level, i.e., by destination RS node and not CID. In this case a forwarding QoS and route sub-header is used. As described above, the forwarding route sub-header can be used such that one sub-header may be used for one group of MAC PDUs to/from one relay node 14. When more than one group of MAC PDUs is encapsulated, multiple such sub-headers may be used.

An exemplary combined forwarding QoS and route sub-header is described with reference to FIG. 11. Combined sub-header 164 includes a 1 bit control field 166. A "1" in control field 166 indicates that the sub-header includes a quantity of MAC PDUs and corresponding QoS fields. A "0" in control field 166 indicates that combined sub-header 164 includes a length field and one QoS field.

If control field 166 is "1", information field 168 includes an 8 bit field indicating the number of MAC PDUs included as well as one QoS for each corresponding MAC PDU. If control field 166 is "0", information field 168 includes a 16 bit field indicating the length of the payload part of the of PDU to/from the destination relay node 14 as well as an 8 bit QoS field, such as the transmission deadline, corresponding to the payload to/from the destination mobile station 16 or base station 12.

RSID quantity field 170 indicates the quantity of RSIDs in the forwarding path included in the sub-header ordered from next hop RS ID to destination RSID. If the quantity is 1, the next hop is the destination RSID. The sub-header also includes a quantity of RSID fields 172 equal to the value in the quantity of sub-headers field. By way of example, each RSID field can be an 8 bit field containing the subordinate RSID.

An exemplary implementation for this fourth arrangement is described. Initially it is noted that each access relay node 14 can operate by being assigned only three connections, namely, basic connection and primary connections carrying the MAC management messages and a forwarding transport connection for relaying mobile station 16 related traffic and messages of mobile stations 16 attached to the corresponding relay node 14 (the "access relay node").

It is contemplated that relay node 14 serves as a forwarding transport connection which is used for carrying mobile station 16 MAC PDUs that are to be relayed in the DL and) UL directions. The corresponding connection CID can be expressed as "F-CID". One F-CID for a relay node 14 can be used for both the DL and UL. For the DL case, base station 12 maps all mobile station 16 MAC PDUs for mobile stations 16 attached to a relay node 14 to the forwarding transport connection of this relay node 14. For the UL case, an access relay node 14 maps all MAC PDUs of the mobile stations 16 attached to it to forwarding transport connection of this relay node 14. The F-CID is assigned by a base station 12 through via a message such as a "DSA-REQ/RSP" message exchange during the routing path setup phase during the initial network entry or network re-entry of relay node 14.

MAC PDUs of mobile stations 16 associated with an access relay node 14 are relayed on the forwarding transport connection between base station 12 and this access relay node 14. The mobile station 16 MAC PDUs having the same QoS class can be encapsulated into an R-MAC PDU and the QoS information field is included in the R-MAC header. One example of QoS information is the QoS class ID (3 bits)+deadline (5 bits)=total 8 bits. QoS information includes the QoS class of a carried R-MAC PDU and the transmission deadline (frame number). For downlink data forwarding, base station 12 can include the destination relay node 14 F-CID and QoS information in the R-MAC header. For the uplink, the access relay node 14 includes its F-CID and QoS information in the R-MAC header. An intermediate relay node 14 can schedule the transmission of the mobile station 16 MAC PDUs carried in an R-MAC PDU based on QoS information along with the received R-MAC PDU, and identify the next hop relay node 14 based on F-CID using its routing table. In this case, intermediate relay nodes 14 do not need to know any QoS profiles and routing information for mobile stations 16 that are not directly attached to it and only relay traffic based on QoS class and deadline information provided by the sender.

The transmission arrangement of the present invention supports QoS using the destination/source relay node 14 F-CID and source QoS control. When a transmission arrangement uses an access relay node 14 forwarding transport connection CID and source QoS control information is implemented, mobile station 16 service flows can be classified into a number of QoS classes. Mobile station 16 MAC management messages are transmitted on the basic connections and the primary connections of mobile stations 16 and can be viewed as two types of services which can be classified, for example, as QoS 1 and QoS 2, respectively. For source QoS control purposes, when new uplink service for a mobile station 16 is established, the QoS class of this service can be determined by corresponding base station 12 and be provided the access relay node 14 of this mobile station 16 through a message exchange, i.e., a DSX-X message exchange.

For scheduling purposes, in the downlink case, base station 12 can encapsulate mobile station 16 MAC PDUs having the same QoS class into an R-MAC PDU and calculate the transmission deadline based on QoS profile for this QoS class. The deadline is expressed as the 5 least significant bits ("LSB") of the frame number where these mobile station 16 MAC PDUs are transmitted by the access relay node 14. In the uplink case, access relay node 14 can encapsulate mobile station 16 MAC PDUs having the same QoS class into an R-MAC PDU and calculate the transmission deadline based on QoS profile for this QoS class. The deadline is the 5 LSB of the frame number in which these mobile station 16 MAC PDUs are transmitted to base station 12. It is noted that the QoS class identity and transmission deadline can be included in the R-MAC header as a QoS information field.

An exemplary data packing arrangement constructed in accordance with the principles of the present invention is described with reference to the block diagram of FIG. 12. As shown therein, a routing header 142 may be associated with a sub-group of MAC PDUs to identify a routing path. For example, for a communication from base station 12 to relay node 14a for mobile stations 16a, 16b, 16c and 16d, a forwarding control sub-header 174 identifying PDUs destined for relay node 14b and a forwarding control sub-header 176 and PDUs destined for relay node 14c are included. Sub-headers 174 and 176 can be arranged as described above based on whether centralized or decentralized QoS and/or route control are being used. Relay node 14a can then generate forwarding control sub-header 178 identifying PDUs destined for relay node 14b, i.e., PDUs for mobile stations 16a and 16b. It is contemplated that sub-headers 174 and 178 can be the same. It is also noted that sub-headers 174, 176 and 178 are used when the corresponding sender controls the QoS and/or the route.

Figure 12:
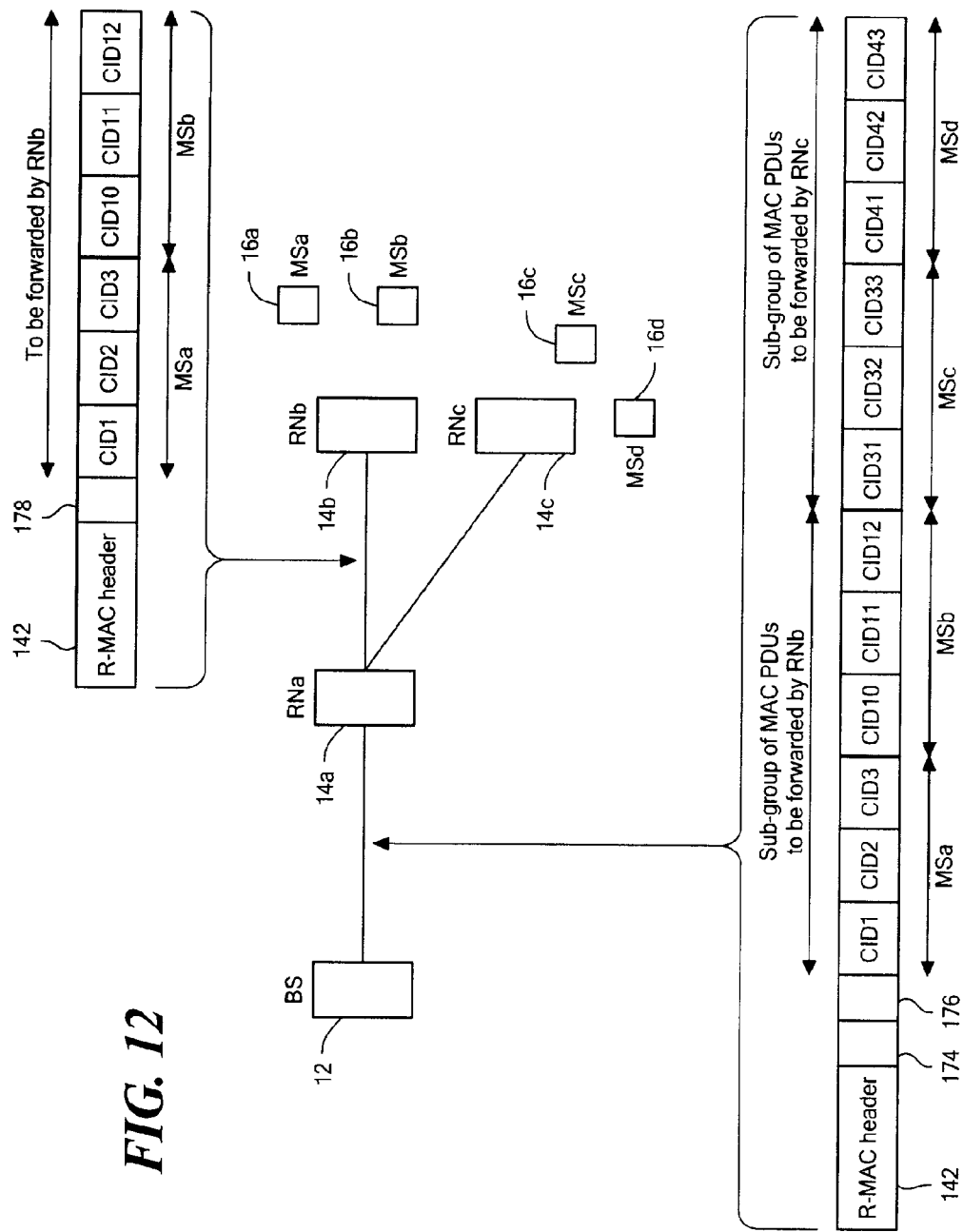
FIG. 12 is a block diagram of a data packing arrangement constructed in accordance with the principles of the present invention.

While FIG. 12 illustrates that a routing header may identify the entire route (i.e. to the destination relay), the broader inventions are not limited in this regard. That is to say, a forwarding control sub-header may only identify part of a route such that a combination of centralized and decentralized route control may be used. Similar concepts are applicable to QoS control as well.

As another embodiment, to avoid the potential re-fragmentation in the last hop in the downlink ("DL") forwarding path (from relay node 14 to mobile station 16), a upper bound on the size of MAC PDU, e.g., the IEEE 802.16e MAC PDU may be set. This upper bound may be exceeded for example, when multiple MAC PDUs from one connection are encapsulated into an R-MAC PDU. To avoid exceeding the upper bound, efficiency may be improved by reducing some redundancy in the communication. A suppression sub-header may be used for this purpose.

A suppression sub-header transmission arrangement may be provided as follows. MAC header suppression can be used when an R-MAC packet is used to encapsulate multiple MAC PDUs from the same connection to be forwarded by a relay node 14 and there is no centralized QoS/route control. To indicate this, a suppression sub-header that immediately follows an R-MAC header may be used.

According to embodiments, such as those described above where centralized QoS/route control is implemented and multiple MAC PDUs from the same connection are encapsulated, MAC header suppression is possible. To indicate such suppression, a suppression sub-header follows the forwarding control sub-header. If multiple sub-groups are encapsulated in an R-MAC PDU, and MAC PDUs in one of the sub-groups are from the same connection, the suppression sub-header can be used and can follow the forwarding control sub-header for this sub-group.

An exemplary suppression sub-header can include a field indicating the number of CIDs among the MAC PDUs from or destined to a relay node 14. This sub-header can also include, for each CID, (1) the CID, (2) the number of MAC PDUs having the same CIDs as indicated in the CID field, and (3), the pseudo-noise ("PN") field in the first MAC PDU having the same CID.

The present invention also provides an arrangement for enhancing security within systems 10 having relay nodes 14. Such security enhancement can be provided through the use of a security "tail" in the R-MAC PDU transmitted at the tail end of the R-MAC payload. In such a case, the R-MAC header includes a security tail inclusion indicator bit. This bit, when set, indicates the presence of the security tail. The security tail can include information used to authenticate the sender, facilitate detection of a modified PDU or detect the retransmission of a PDU. For example, security tail can include a keyed-hash message authentication code ("HMAC") or other message authentication code as may be known, a packet number, etc.

The above describes arrangements in which a new header and sub-header to support the R-MAC layer is provided. It is also contemplated that the present invention can be implemented using a protocol stack for an embodiment of the invention where the IEEE 802.16e DL MAC is modified, hereinafter referred to as an Enhanced-MAC ("E-MAC"), to facilitate backward compatibility with the IEEE 802.16e standard. According to this embodiment of the invention one MAC PDU encapsulates service data units ("SDU") from one CID.

While the embodiments described above illustrate formats used to deliver PDUs between a base station 12 and a mobile station 16, additional extensions to the header fields may be used to permit the packing and transport of other PDUs destined for or received from other types of devices. Some of these PDUs, for example, may be destined for the relay node itself as part of its control, signaling and maintenance. Other PDUs may be destined for devices that are attached to the relay node 14 through other wired or wireless connections. The relay node 14 may thus be used to receive and forward PDU traffic from fixed devices such as video cameras or from mobile stations 14 that are formatted according to another radio interface standard but which are arranged for carriage via the relay node 14/base station 12 network, i.e., system 10.

An exemplary protocol stack for implementing the E-MAC arrangement described above is the same as that shown in FIG. 7 with the exception that the E-MAC PDUs are substituted for R-MAC PDUs. It is also noted that the four arrangements for implementing traffic control described above with respect to R-MAC implements is generally the same for E-MAC implementations, with the exception that multiple MAC PDUs are not supported in the E-MAC sub-headers.

For example, with respect to the first traffic control arrangement described above, as with the R-MAC embodiment, no control field or sub-header field is needed. With respect to the second traffic control arrangement described above (centralized QoS control and decentralized route control), a QoS control extended sub-header is defined which includes a QoS field defining the deadline for the transmission to base station 12 or mobile station 16, as the case may be.

With respect to the third traffic control arrangement described above (centralized route control and decentralized QoS or hybrid route control and a route table at relay node 14 level), a route extended control sub-header is defined. As an example, the route extended traffic control sub-header includes a field for the quantity of RSIDs in the forwarding path and fields having the list of RSIDs in the forwarding path.

With respect to the fourth traffic control arrangement described above (centralized/hybrid route and centralized QoS control) a QoS route extended traffic control sub-header is defined. This control sub-header is the union of the extended control sub-headers described above with respect to the second and third E-MAC arrangements, i.e., a QoS field as well as the RSID forwarding path information.

To support traffic forwarding control, it is contemplated that existing downlink and uplink extended sub-headers can be modified to include the extended sub-headers described above. In the downlink, ES type 6 can have an 8 bit body size for the QoS sub-header, ES type 7 can have a variable bit body size to support the route sub-header and ES type 8 can have a variable bit body size to support the combined QoS/route sub-header. In the uplink, ES type 5 can have an 8 bit body size for the QoS sub-header, ES type 6 can have a variable bit body size to support the route sub-header and ES type 7 can have a variable bit body size to support the combined QoS/route sub-header.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A method to pack a plurality of media access control ("MAC") packet data units ("PDUs") into a relay packet, the method comprising:
receiving a plurality of MAC PDUs;
grouping the plurality of MAC PDUs into a relay packet into at least one sub-group;
inserting, into the relay packet, a routing header and at least one sub-header, the routing header followed by the at least one sub-header, each sub-header associated with a sub-group of the plurality of MAC PDUs and indicating a relay station ("RS") that receives MAC PDUs in that sub-group, wherein the RS is located between a base station and a mobile station and the routing header includes a relay station ID ("RSID") inclusion indicator field, the RSID inclusion indicator field set to a first value if the routing header includes at least one RSID and set to a second, different value if the routing header does not include at least one RSID; and
routing the relay packet to a first RS indicated in a first sub-header.

2. The method according to claim 1, wherein the routing header includes a header control field to indicate a type of the routing header, the type of the routing header is used for data forwarding.

3. The method according to claim 1, wherein if the RSID inclusion indicator field indicates that at least one RSID is included, the routing header further includes the at least one RSID in a RSID/reserved field.

4. The method according to claim 1, wherein if the RSID inclusion indicator field indicates that at least one RSID is not included, the routing header further includes a RSID/reserved field reserved for future use.

5. The method according to claim 1, wherein the at least one sub-header includes a control field with a value of 1 to indicate that the at least one sub -header includes a number of MAC PDUs and corresponding quality of service ("QoS") fields.

6. The method according to claim 5, wherein if the control field has the value of 1, an information field within the at least one sub-header indicates the number of MAC PDUs and one QoS for each corresponding MAC PDU.

7. The method according to claim 1, wherein the at least one sub-header includes a control field with a value of 0 to indicate a length field and one QoS field.

8. The method according to claim 1, wherein the at least one sub-header includes a RSID quantity field to indicate a number of RSIDs in an ordered forwarding path from a next hop RSID to a destination RSID.

9. The method according to claim 8, wherein the RSID quantity field with a value of 1 indicates that the RS is the destination RS.

10. The method according to claim 1, wherein the at least one sub-header includes a quantity of RSID field equal to a number of sub-headers.

11. The method according to claim 1, wherein the relay packet is received at the first RS, and wherein the first RS removes an ID of the first RS from the relay packet and forwards the relay packet without the ID of the first RS to a next hop RSID in a next sub-header.

12. A system for wireless communication, the system comprising:
a memory; and
at least one hardware processor communicatively coupled with the memory and configured to:
receive a plurality of media access control ("MAC") packet data units ("PDUs");
group the plurality of MAC PDUs into a relay packet into at least one sub-group;
insert, into the relay packet, a routing header and at least one sub-header, the routing header followed by the at least one sub-header, each sub-header associated with a sub-group of the plurality of MAC PDUs and indicating a relay station ("RS") that will receive MAC PDUs in that sub-group, wherein the RS is located between a base station and a mobile station and the routing header includes a relay station ID ("RSID") inclusion indicator field, the RSID inclusion indicator field set to a first value if the routing header includes at least one RSID and set to a second, different value if the routing header does not include at least one RSID; and route the relay packet to a first RS indicated in a first sub-header.

13. The system according to claim 12, wherein the routing header includes a header control field to indicate a type of the routing header, the type of the routing header is used for data forwarding.

14. The system according to claim 12, wherein if the RSID inclusion indicator field indicates that at least one is included, the routing header further includes the at least one RSID in a RSID/reserved field.

15. The system according to claim 12, wherein if the RSID inclusion indicator field indicates that at least one RSID is not included, the routing header further includes a RSID/reserved field reserved for future use.

16. The system according to claim 12, wherein the at least one sub-header includes a control field with a value of 1 to indicate that the at least one sub -header includes a number of MAC PDUs and corresponding quality of service ("QoS") fields.

17. The system according to claim 16, wherein if the control field has the value of 1, an information field within the at least one sub-header indicates the number of MAC PDUs and one QoS for each corresponding MAC PDU.

18. The system according to claim 12, wherein the at least one sub-header includes a control field with a value of 0 to indicate a length field and one QoS field.

19. The system according to claim 12, wherein the at least one sub-header includes a RSID quantity field to indicate a number of RSIDs in an ordered forwarding path from a next hop RSID to a destination RSID.

20. The system according to claim 19, wherein the RSID quantity field with a value of 1 indicates that the RS is the destination RS.

21. The system according to claim 12, wherein the at least one sub-header includes a quantity of RSID field equal to a number of sub-headers.

22. The system according to claim 12, wherein the relay packet is received at the first RS, and wherein the first RS removes an ID of the first RS from the relay packet and forwards the relay packet without the ID of the first RS to a next hop RSID in a next sub-header.

23. A non-transitory computer readable medium for packing a plurality of media access control ("MAC") packet data units ("PDUs") into a relay packet, the computer readable medium storing instructions to cause a processor to perform operations comprising:

receiving a plurality of MAC PDUs;

grouping the plurality of MAC PDUs into a relay packet into at least one sub-group;

inserting, into the relay packet, a routing header and at least one sub-header, the routing header followed by the at least one sub-header, each sub-header associated with a sub-group of the plurality of MAC PDUs and indicating a relay station ("RS") that receives MAC PDUs in that sub-group, wherein the RS is located between a base station and a mobile station and the routing header includes a relay station ID ("RSID") inclusion indicator field, the RSID inclusion indicator field set to a first value if the routing header includes at least one RSID and set to a second, different value if the routing header does not include at least one RSID; and routing the relay packet to a first RS indicated in a first sub-header.

* * * * *